United States Patent [19]

Hoque et al.

[11] 3,819,281

[45] June 25, 1974

[54] INDEX-SECTOR DETECTION SCHEME FOR MAGNETIC DISC MEMORY

[75] Inventors: Abul M. M. Hoque, Willingboro, N.J.; Michael J. Cullen, Hatfield, Pa.

[73] Assignee: Sperry Rand Corporation, New York, N.Y.

[22] Filed: June 14, 1973

[21] Appl. No.: 370,191

Related U.S. Application Data

[63] Continuation of Ser. No. 212,202, Dec. 27, 1971, abandoned.

[52] U.S. Cl. .............................................. 360/51

[51] Int. Cl. .......................................... G11b 23/30

[58] Field of Search 340/174.1 A, 174.1 B, 174.1 G, 340/174.1 H

[56] References Cited

UNITED STATES PATENTS 2,989,690 6/1961 Cook .......................... 340/174.1 B

*Primary Examiner*—Vincent P. Canney
*Attorney, Agent, or Firm*—R. A. Kuypers

[57] ABSTRACT

There is disclosed herein a memory disc file arrangement for use with a movable head assembly wherein the bottom-most disc is divided into a plurality of visible sector marks arranged around the periphery. One additional visible mark called the index is additionally provided and is located near the last sector mark. Both the index and sector marks are sensed optically. There is also disclosed a technique for determining when the speed of the disc has reached a first predetermined level which is below full speed. This first speed level is able to sustain the aerodynamic characteristics of the flying magnetic heads which are used in conjunction with the disc. The technique also enables the disc speed to be detected when it falls to a second predetermined level which is below the first level. The second speed level is not able to sustain the aerodynamic characteristics of the heads. The first and second speed determinations are utilized to produce signals for engaging and retracting the flying heads, respectively.

6 Claims, 4 Drawing Figures

INVENTORS:
ABUL M. M. HOQUE
MICHAEL J. CULLEN
BY Rene A. Kuypers
ATTORNEY

INDEX-SECTOR DETECTION SCHEME FOR MAGNETIC DISC MEMORY

CROSS REFERENCE TO RELATED APPLICATION

This application is a continuation of patent application Ser. No. 212,202, filed Dec. 27, 1971 now abandoned.

BACKGROUND OF THE INVENTION

This invention relates in general to the field of memory disc files. In particular, the invention relates to the art of optically sensing index and sector locations on a memory disc and for detecting the speed of the disc.

Known prior art arrangements for determining index and sector locations on a memory disc have been generally unsatisfactory since they have relied on magnetic techniques. An index mark determines the origin point on the disc and occurs once every revolution. Sector marks indicate the start of a word or a block of data on the disc. Magnetic techniques have tended to be unsatisfactory since very close coupling is required between the magnetic head and the disc and therefore the head must be physically positioned very near the disc. Accordingly if the disc is out of round possible damage to the disc can occur.

An additional shortcoming of the known prior art techniques used for sensing both index and sector marks on memory discs is that stray magnetic fields are sometimes produced by other contiguous magnetic circuits and components, such as a motor. These magnetic circuits and components sometimes produces stray magnetic fields such as, for example, the field produced by the start-up current of a motor which are sometimes detected by the reading head assembly. The result is that occasionally spurious index and sector signals are produced. Obviously, these signals produce errors in operation and control of a computer.

In addition to the above-noted shortcoming, it has been noted that the prior art magnetic reading head arrangement requires that the head be positioned and repositioned every time a disc pack is removed or placed on a spindle. This magnetic reading head is normally placed on a hinge near the disc periphery and is subject to heavy handling. Therefore it is likely that the head may get out of alignment and possibly damage the disc. Therefore, it can be readily appreciated that the prior art hinge arrangement for detecting the index and sector marks is not only cumbersome and unwieldy, but also it is a source of potential damage to the disc itself.

SUMMARY OF THE INVENTION

The invention discloses the arrangement of sensing index and sector marks on a magnetic disc by optical means. A plurality of sector marks and a single index mark are located on the underside of a disc around its periphery. The disc carrying the index and sector marks is located as the bottom are of a stack of discs, which is frequently referred to as a disc file. As the disc file is rotated, each time that an index or sector mark passes an optical sensing station, the pulses generated are fed to appropriate logic circuitry. The logical circuitry functions to effectively discriminate between the index pulse from the sector pulses. The timing of the index pulses are then sampled to determine whether the speed of the disc reaches a first predetermined value. The first predetermined value is a function of the speed necessary to provide the aerodynamic lift required to operate the so-called flying head. If the speed reaches the first predetermined level, the magnetic heads are brought into position over the discs. The logic means also provide that when the speed of the disc is at a second predetermined level, which is below the first predetermined level, then the disc speed will not provide the necessary aerodynamic properties for the flying heads. Therefore they are retracted to prevent damage to the head and/or the disc.

DESCRIPTION OF THE PREFERRED EMBODIMENT

Figure 1:
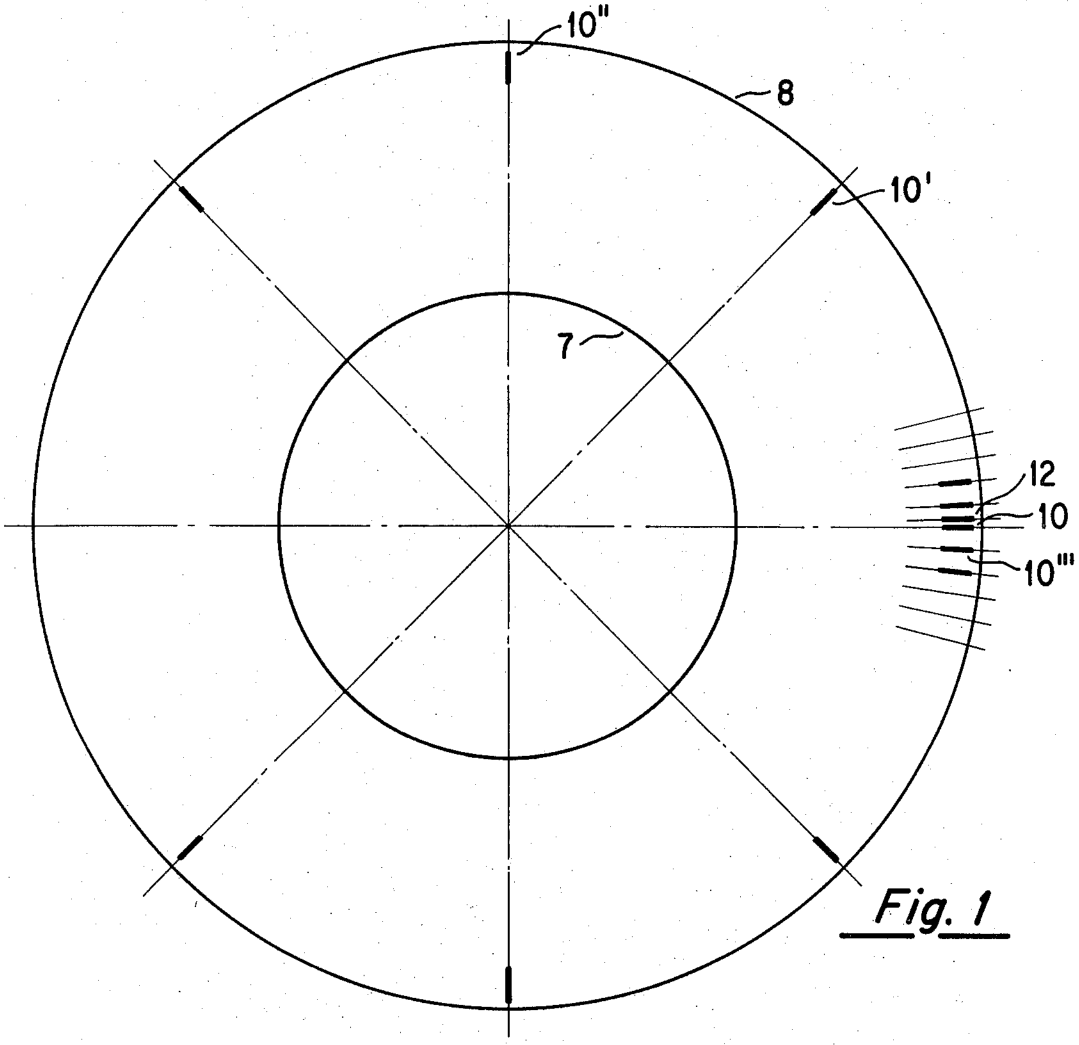
FIG. 1 depicts a magnetic memory disc having sector and index marks located around its periphery.

Referring now to FIG. 1, there is depicted in accordance with this invention a magnetic disc memory 8 having a plurality of sector marks equally positioned around its periphery. In a preferred embodiment there are 128 sector marks equally positioned around the disc, which has a radius of approximately 7 inches. Several sector marks 10, 10′, 10″ and 10‴ are shown by way of example. In a preferred embodiment, two consecutive sector marks such as marks 10 and 10‴ subtend an angle of 2° 48′ 45″ at the center of the disc. A single index mark 12 is juxtaposed counterclockwise to the sector mark 10 which is designated on the last mark. The angle subtended by the index mark 12 and the sector mark 10 is 0°, 44′. The inside circuit cut-out 7 of the disc 8 is of such a diameter as to fit on a spindle which will cause a disc file (a stack of discs) to rotate in a manner well known in the art. The sector marks 10, 10′, 10″, etc., and the index mark 12 are white in color on a black matte background. The reason for this will be more clearly evident by referring now to FIG. 2.

Figure 2:
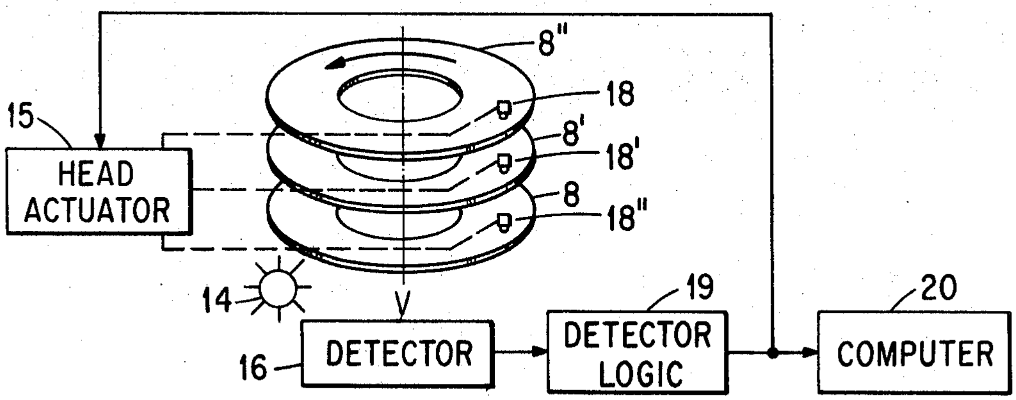
FIG. 2 shows a disc pack memory used in conjunction with the instant invention.

FIG. 2 illustrates a disc pack arrangement wherein a plurality of disc 8, 8′ and 8″ are shown stacked above one another in vertical fashion. In actual practice, these discs would be positioned on a spindle and rotated at high speed in a counterclockwise manner looking towards the rotating motor. In the present embodiment, the discs are rotated at a speed of 2,400 RPM. As is well known in the art, the upper portion of the disc has a magnetic coating for recording data thereon. A typical disc memory may have 400 tracks per surface for recording and storing information by means of the head modules 18, 18′ and 18″ which are juxtaposed to the respective recording discs 8″, 8′ and 8. These head modules are shown connected by dotted lines to the head actuator 15. It is the purpose of the head actuator 15 to bring the respective head modules either in the proper track position on the disc or to withdraw then completely away from the disc file.

In the arrangement, light source 14 and detector 16 are co-axially positioned beneath the disc 8 so that its underside is illuminated and the rays of light are reflected vertically back to the detector 16. Therefore detector and the light source are physically at the same reference point. Therefore, as the entire disc pack rotates counterclockwise the sector marks 10, 10′, 10″ and 10‴ as well as the single index mark 12 are illuminated so that the variations of light caused by the white sector and index marks on the black background will be detected by the optical detector 16 which is a photo diode. The detection of the 129 marks will cause the optical detector 16 to produce 129 pulses. These pulses will be directed into the detector logic circuitry 18 where the index mark 12 will be separated from the 128 sector marks. The logic circuitry 18 will provide an indication to the computer 20 that the discs are operating at a sufficient speed to provide the aerodynamic characteristics required for the proper operation of the heads 18, 18′ and 18″.

In the instant embodiment the disc speed will be proper for bringing the head into position when the speed has reached at least 85 percent of full speed or 2,040 RPM. When the disc pack has reached at least 85 percent of full speed, a signal is generated by the detection logic 18 to indicate that the computer 20 can begin internal sequencing prior to accessing the memory files at 100 percent speed or 2,400 RPM. In other words, it will take a few seconds after reaching 85 percent of full speed to reach full speed or 2,400 RPM and the central processor of the computer can utilize this time period for various computer housekeeping functions prior to accessing the memory. Since the computers of the present day art operate in a microsecond and a nanosecond time range it can be readily appreciated that several seconds represents an exceedingly long period of time for conditioning the computer to access the disc memory. It should be noted that the amount of time required to reach 100 percent speed from 85 percent speed is a function of the horsepower of the driving motor, the number of discs in the file, inertia, etc.

Figure 3:
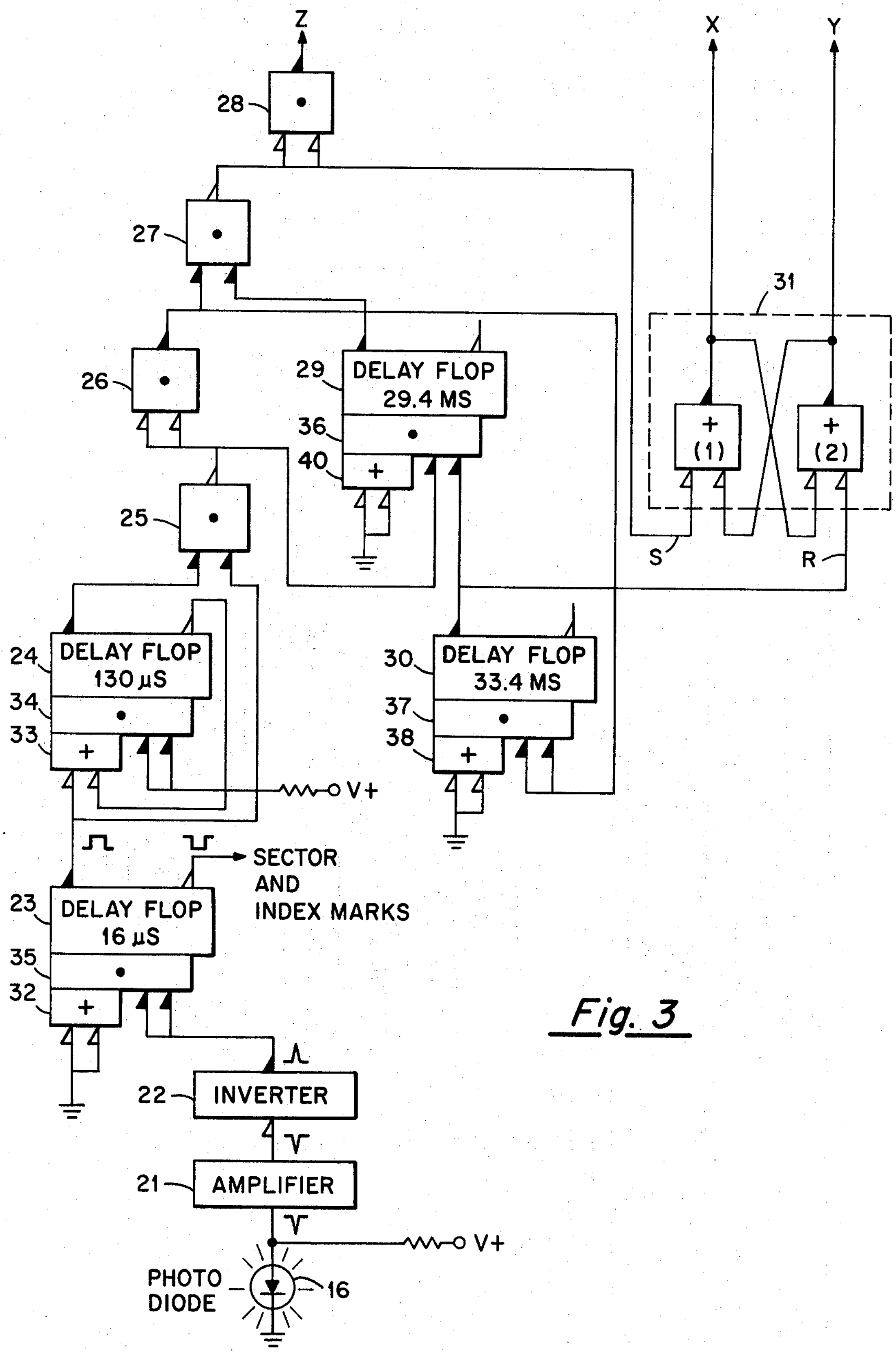
FIG. 3 depicts the logical arrangement for detecting sector and index scale FIG.

Referring now to FIG. 3, there is shown in greater detail the detector logic 18 shown in FIG. 2. The ground rules for describing this logic will be as follows: a white input or output flag entering or leaving a logic block is deemed to have a low (L) voltage value, whereas a flag that is colored black is considered to have a high (H) voltage value. A further ground rule in describing the logic operation of FIG. 3 is that for the particular combination of input signals shown as being applied to the logical circuit 18 the outputs will have the particular output values shown. On the other hand, if the inputs are opposite to the values shown, the outputs will be reversed as shown. By way of example, if an L signal is applied to the inverter 22 an H output will be obtained; conversely, if an H signal is applied to the inverter 22 an L signal will be obtained at its output. Furthermore, the combination of L and H signals shown is such as to provide an indication to the computer 20 that the flying heads are being brought into position over the discs.

As discussed above briefly, each time that an index or sector mark passes the optical sensor 16 a pulse is generated. In the instant embodiment, this pulse is negative in polarity as applied to the input terminal of the amplifier circuit 21 as shown on the top line of FIG. 4. Amplifier 21 is a two-stage transistor circuit whose output is applied to the input of the inverter stage 22. After amplification in the two-stage amplifier the negative (i.e., L) pulse remains L in polarity. In accordance with the ground rules above established the L input applied to the inverter 22 is H at its output and is applied simultaneously to separate inputs of the AND gate 35 coupled to the input of the delay flop 23. It should be noted hereat that the delay flop 23 in conjunction with the AND gate 35 and the OR gate 32 comprises a well known circuit known in the art as a Fairchild 9601 retriggerable single shot flip-flop or delay flop. The two inputs to the OR gate 32 and L, therefore making its output H. This H output is applied as the third input to the AND gate 35. Therefore, at this point in time, all the inputs to the AND gate 35 are H which causes the delay flop 23 to be triggered. The delay flop 23 is triggered for a period of 16 microseconds as is shown on the second line of FIG. 4.

Figure 4:
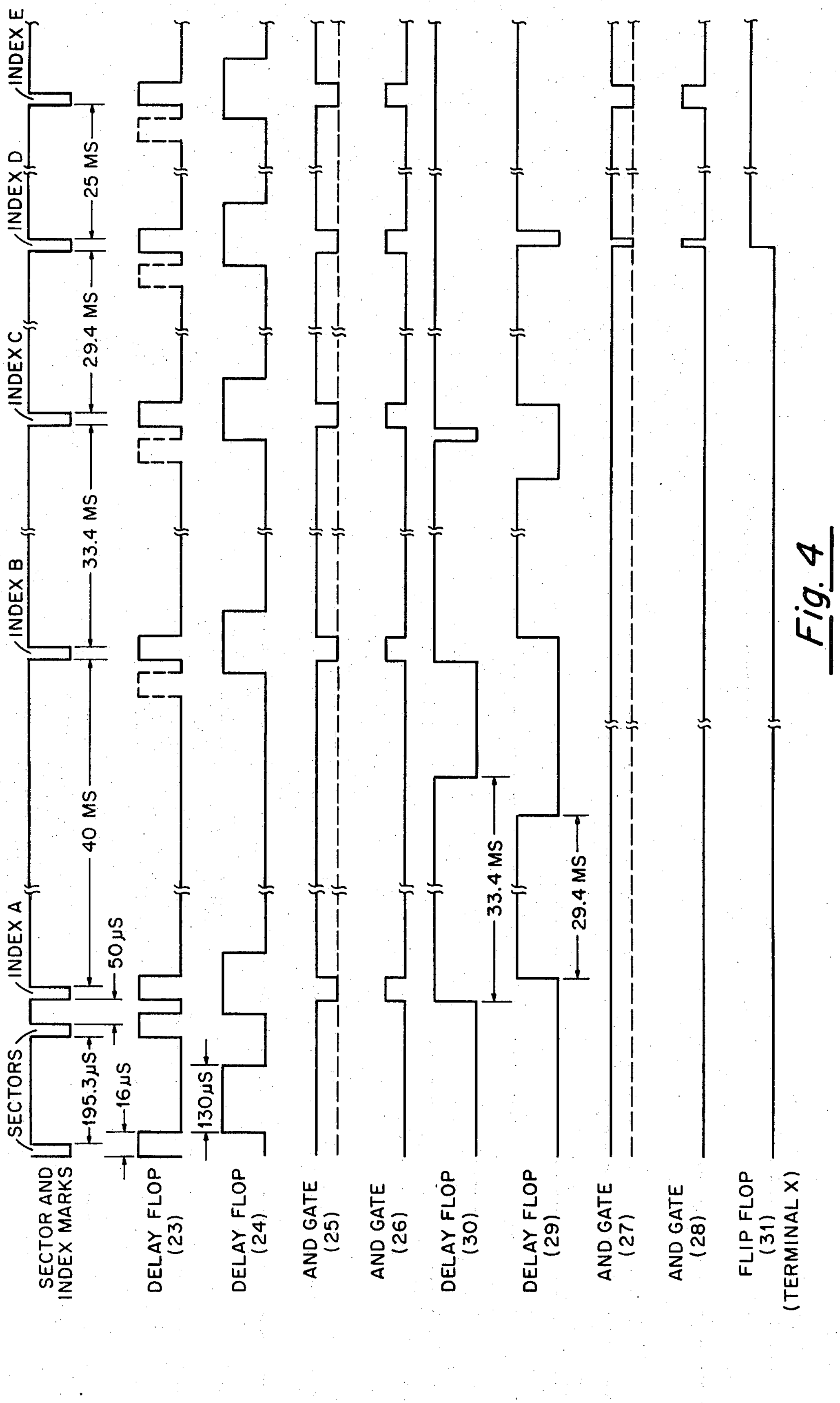
FIG. 4 depicts the timing chart which is not drawn to scale for the signals developed in the logical arrangement of FIG. 3.

In view of the triggering of the flip-flop 23 for 16 microseconds, the black output terminal will be H and the white output terminal will be L. Operating at 2,400 RPM the sector marks will be generated every 195.3 microseconds and therefore, for every sector mark that is generated by the optical detector 16 the delay flop 23 will be triggered for the required 16 microseconds as shown in FIG. 4. The single index mark is separated from its last sector mark 10 by a time period of 50 microseconds at full speed as also depicted in FIG. 4.

The L output terminal of the delay flop 23, which contains both index and sector marks all of 16 microseconds width, is sent to the computer 20 (FIG. 2) for determining what sector of the magnetic disc may be accessed by the heads. Therefore, latency time is accessing data recorded on the discs is greatly reduced in view of the fact that locations on the disc can be located without first returning to the origin or index. The H output of the delay flop 23 is applied to an input of the OR gate 33. The L output of delay flop 24 is fed back as one of the inputs to the OR gate 33. The two inputs to the AND gate 34 which are connected to V are always in an H state. Since the inputs to the OR gate 33 must be L to trigger the delay flop 24, it is apparent that the triggering of delay flop 23 will cause the delay flop 24 to remain untriggered. Therefore, after a 16 microsecond time period the delay flop 23 will return to its quiescent state thereby causing its H output terminal to become L. When delay flop 23 returns to the quiescent state, the delay flop 24 will be triggered for a period of 130 microseconds. The relationship of the signals produced by delay flops 23 and 24 are shown more graphically on lines 2 and 3 of FIG. 4.

Therefore it can be readily appreciated that the AND gate 25 will remain in the unpermissed state for 128 sector marks (i.e., the output terminal will remain H) since the gate's input terminals will not be both H during this moment in time. The H output level can be seen by referring to the fourth line of FIG. 4. The H output of the AND gate 25 is simultaneously applied to the two input terminals of the AND gate 26 as well as one of the input terminals of AND gate 36. When the two inputs of the AND gate 26 are H, its output is L as can be seen by referring to the fifth line of FIG. 4.

The L output of the AND gate 26 is applied simultaneously to the AND gate 27 as well as to two inputs of the AND gate 37. Therefore, the delay flop 30 will not be triggered and its output connected to AND gate 36 will remain L. The failure to trigger delay flop 30 by the above-described circuit conditions can be better viewed by referring to line 6 of FIG. 4. In view of the above-described untriggered state of delay flop 30, the delay flop 29 will likewise not be triggered. Again, this may be seen graphically by referring to line 7 of FIG. 4. Accordingly, both inputs to AND gate 27 are L causing its output to be H (see line 8 of FIG. 4). The H output of the AND gate 27 is applied simultaneously to the two inputs of the AND gate 28 as well as to one of the set input leads S of the flip-flop circuit 31. The H input signal applied simultaneously to the AND gate 28 causes its output to become L. The output terminal Z or the AND gate 28 is also utilized for control purposes in the computer 20 (see FIG. 2).

Flip-flop 31 comprises a bistable multivibrator which quiescently resides in a reset mode of operation such that output X is L and output Y is H. This is because input terminal R is quiescently L and input terminal S is quiescently H. In other words, at this point in time the output of the AND gate 27 applied to the S terminal is H and the output of delay flop 30 applied to the R terminal is L since the delay flop 30 was not triggered. Therefore, the output Y of the OR gate (2) is H and the output of the OR gate (1) is L. This may be readily viewed by referring to the last line of FIG. 4. For purposes of simplicity, terminal Y output is not shown in FIG. 4 but is simply obtained by reversing the signal level of terminal X. For operation purposes, the set terminal of the flip-flop will be designated by S and the reset terminal by R.

Let us now assume the situation wherein the single index mark 12 (see FIG. 1) is being sensed by the optical detector 16 after the last sector mark 10 has been detected. As shown on line 1 of FIG. 4, the index mark is separated from the last sector mark by a timing factor of 50 microseconds at 2,400 RPM. In a manner previously described, the delay flop 23 will be set by the index for a period of 16 microseconds. However, the delay flop 24 had been previously triggered by the last sector mark 10 for a time span of 130 microseconds. The delay flop 24 will not be re-triggered for another 130 microsecond period by the index pulse since its negative output is fed back to the OR gate 33. In other words, since this negative pulse (the opposite polarity signal of that shown in FIG. 4) occurs prior in time to the next positive index pulse, the latter is without any effect. Accordingly, during this time period both inputs to the AND gate 25 are H and its output reverts to a L condition as can be viewed on line 4 of FIG. 4. The L output of AND gate 25 is applied simultaneously to the two input terminals of the AND gate 26 as well as to one of the inputs to the AND gate 36 of the delay flop 29. The application of a L input signal to AND gate 26 causes its output to revert to the H state.

The H output of AND gate 26 is simultaneously applied to one input terminal of the AND gate 27 as well as to the two inputs of the AND gate 37. Since the inputs to the OR gate 38 are L in view of their permanent connection to ground potential its output is H so that the AND gate 37 is permissed. The permissing of the AND gate 37 causes the triggering of the delay flop 30 for a period of 33.4 milliseconds as seen on line 6 of FIG. 4. The H output of delay flop 30 is applied to AND gate 36. However, it will be recalled that the output of the AND gate 25 is also applied to the other input of the AND gate 36. Since a L signal exists at the output of AND gate 25, triggering of delay flop 29 will be inhibited.

In view of the above mentioned circuit conditions, the AND gate 27 output terminal remains in the H state. Since the H output of the AND gate 27 is also applied to the input terminals of AND gate 28, the output of the latter (i.e., terminal Z) remain L as seen in FIG. 4. Furthermore, the flip-flop 31 remains in its quiescent condition, (i.e., terminal X is L and terminal Y is H) since the input signal received from the AND gate 27 is still H. The output condition of terminal X may be seen on the last line of FIG. 4.

As briefly mentioned above, the instant invention can readily determine by utilizing logic techniques when the disc has reached 85 percent of full speed. This feature may be better understood by viewing the operation of certain index pulses which are both above and below the 85 percent level. Returning therefore to FIG. 4, five index pulses A, B, C, D and E are shown on line 1 for discussion purposes. The 128 sector pulses which are produced between two index pulses are not shown for purposes of simplicity. The last sector pulse prior to the indexes A, B, C, D and E are shown however since these pulses affect the logical operation for determining whether the disc file has reached speed.

Referring again to line 1 of FIG. 4, the time separation between index pulses A and index B is arbitrarily chosen as 40 milliseconds and represents approximately 62 percent of full speed; in like manner the time separation between index pulses B and C is 33.4 milliseconds or 75% of full speed. As can be readily ascertained by referring to lines 2–9 of FIG. 4, these respective pulses do not cause a change in the output of terminal X of flip-flop 31 (i.e., terminal X remains L). In other words, index pulses B and C produce the identical results upon the logical operation disclosed as did the results produced by the index A previously discussed and accordingly, will not be further developed. It should be noted however that as the disc speed increases the time separation when delay flop 29 and 30 (see lines 6 and 7 of FIG. 4) are in the untriggered state begins to decrease. This effect continues as the disc speed increases and its result will be clearly evident in the discussion following.

Let us now assume that the magnetic disc file shown in FIG. 2 has reached 85 percent of its speed or 2,040 RPM. At 85 percent of speed index marks C and D are 29.4 milliseconds apart. This is shown clearly on line 1 of FIG. 4. Therefore, when the index pulse D is generated the delay flop 23 is triggered for 16 microseconds in the manner previously described. The delay flop 24 in turn is triggered for a period of 130 microseconds when the delay flop 23 returns to zero after the last sector pulse (shown in dotted form). Since the 130 microsecond triggered output of delay flop 24 and the 16 microsecond triggered output of delay flop 23 are anded by AND gate 25, the output accordingly goes L. The L output of the AND gate 25 is applied simultaneously to the two inputs of the AND gate 26 so that the latter produces a H output and to the AND gate 36 of delay flop 29. At this point the triggered state of delay flop 30 extends beyond the time period when AND gate 26 is conditioned so that the pulse produced triggers the delay flop 30 for another period of 33.4 milliseconds. This gives the appearance on line 6 of FIG. 4 of a continuous H voltage level. Further index marks as developed at 100 percent of speed will therefore continue to retrigger delay flop 30. The L output of the AND gate 25 is also applied as an input to the AND gate 36. It should be noted hereat that the triggered state of delay flop 29 extends slightly into time period when the output of AND gate 26 is H. Accordingly, a short duration L pulse (see line 8 of FIG. 4) is produced by AND gate 27. When AND gate 25 returns to a H state, the delay flop 29 is retriggered for another period of 29.4 milliseconds.

The L output pulse of AND gate 27 is applied simultaneously to the input of AND gate 28 and to the S terminal of the OR gate (1) of the flip-flop 31. In view of the above described input conditions applied to AND gate 28, its terminal Z goes H (see line 9 of FIG. 4). Furthermore at this point in time, the input level of the OR gate (1) of flip-flop 31 is L, thereby setting the latter (see the last line of FIG. 4). It should be noted that the second input level to OR gate (1) (i.e., the output of OR gate (2) is L since the delay flop 30 output is H at this time). This can be seen by referring to line 6 of FIG. 4. Accordingly, output terminal X goes H and terminal Y goes L when the disc file reaches 85 percent of speed. This signal is therefore sent to both the computer 20 as well as the head actuator 15 (see FIG. 2) for control purposes as above mentioned with respect to the flying heads and further to notify the computer that it is to get ready to access the memory.

Index E is shown for purposes of indicating when the speed has reached 100 percent or when there is a time separation of 25 milliseconds. In all respects, the logical operation will continue in the manner above described except that delay flops 29 and 30 continue in a H state since they will be continually retriggered and therefore the X terminal of the flip-flop 31 will remain in the set or H state until it is reset, indicating that the memory can be accessed by the computer and further that the flying heads are operating in a proper environment.

Referring again to the top line of FIG. 4, it can be readily seen that index E represents 100 percent of speed and for ease of understanding it will be deemed that there is an indication of loss of disc speed by going in a leftward direction from index E. Accordingly, loss of speed will be considered to have taken place by referring to indexes D, C and B with index E considered as the reference.

In actuality, it is clear that in considering a loss of speed from the 100 percent reference, the indexes would be generated to the right of index E. Let it now be assumed that the memory disc file shown in FIG. 2 loses speed due to some malfunction or loss of power. In the event that the loss of speed occurs to a certain degree it has been found that the aerodynamic characteristics of the magnetic head will not be maintained and therefore the disc and/or the head can be seriously damaged. Therefore, it has been determined that in the instant embodiment when the speed of the disc falls below 75 percent or below 1,800 RPM it is necessary to withdraw the heads from their position in juxtaposition to the disc. This operation is logically achieved in the following manner. Viewing the top line of FIG. 4 and in particular the indexes E to D, it can be readily appreciated that when the speed drops to 85 percent of normal speed, it is still sufficient to keep the flip-flop 31 in the set condition and accordingly, terminal X remains H and terminal Y, L.

Considering a further loss of speed from index D to index C as seen on line 1 of FIG. 4 or when the speed drops just below 85 percent it can be recognized that AND gate 27 will go H since delay flop output 29 will not be continuously in a triggered state (see line 7 of FIG. 4). This will cause a H instead of a L signal to be applied to the S terminal of the OR gate (1) of the flip-flop 31. In addition it should be observed that the output of the delay flop 30 also reverts to the untriggered state when the speed drops below 75 percent so that a L signal is applied to the R terminal of the flip-flop 31. The L signal applied to R of the flip-flop 31 causes terminal X to revert or reset to the L state and terminal Y to change to the H state (see last line of FIG. 4). These signals applied to the computer 20 and head actuator 15 (shown in FIG. 2) will indicate that the heads 18, 18′ and 18″ are to be removed from their positions juxtaposed to the discs in order to prevent damage. Further, this signal change will indicate the computer processor that the memory cannot be accessed at this time.

It should be observed that the 85 percent disc speed during the start-up cycle and the 75 percent speed during a so-called shut-down cycle represent two distinct operational points. These two operational points have been selected to provide sufficient separation as to prevent confusion to the operating machinery. In other words, if the 85 percent point were utilized as the operational point during start-up as well as shut-down, there would be difficulty in discrimination and the disc could not properly find its operational mode.

In the light of the above discussion it is clear that the logic arrangement provides a means for discriminating between the index and sector marks. Furthermore, the logic arrangement disclosed enables a first speed below full speed as well as a second speed below full to be determined.

What is claimed is:

1. The system comprising:

a. a disc having a magnetic coating on its upper surface; and b. the bottom side of said disc having a plurality of equally spaced indicia for identifying certain sector locations on said disc;

c. an additional indicia juxtaposed between two said equally spaced consecutive sector marks for locating the origin of whereat said information is stored on said disc such that the spacing between the additional indicia and its next adjacent indicia are of unequal spacing to said first mentioned equal spacing;

d. means for rotating said disc;

e. means for reading and recording information on said magnetic coating, said last mentioned means being moveable;

f. means for optically sensing said sector and index marks and means for discriminating between said sector and index marks.

2. The system in accordance with claim 1 wherein said index and sector marks located on said disc are oriented in a downward direction facing said optical sensing means.

3. The system in accordance with claim 2 wherein said discriminating means includes means for determining that said rotating means has achieved a first and second speed which are below its rated speed and said first speed is higher than said second speed.

4. The system in accordance with claim 3 wherein said means for discriminating between said first and second speed includes means for generating a first and second signal, respectively, indicative of said first and second speeds, said signals being coupled to said moveable means for reading and writing information.

said first signal causing said read-write head to move into juxtaposition with respect to said disc and said second signal causing said head to be retracted from said disc area.

5. The system in accordance with claim 1 wherein said means for optically sensing includes a photo diode.

6. The system in accordance with claim 1 wherein said non-magnetic side of said disc comprises a black matte background having white index and sector marks.

* * * * *